US012406546B2

(12) United States Patent
Small et al.

(10) Patent No.: US 12,406,546 B2
(45) Date of Patent: Sep. 2, 2025

(54) GAMING DEVICE WITH TRANSPARENT DISPLAY

(71) Applicant: IGT, Las Vegas, NV (US)

(72) Inventors: David Small, Moncton (CA); Michael Russ, Styria (AT); Aaron Corey, Moncton (CA); Julia-Ines Lerchbaumer, Spielfeld (AT); Daniel Landry, Moncton (CA)

(73) Assignee: IGT, Las Vegas, NV (US)

( * ) Notice: Subject to any disclaimer, the term of this patent is extended or adjusted under 35 U.S.C. 154(b) by 309 days.

(21) Appl. No.: 18/087,032

(22) Filed: Dec. 22, 2022

(65) Prior Publication Data

US 2024/0212418 A1 Jun. 27, 2024

(51) Int. Cl.
*G07F 17/32* (2006.01)

(52) U.S. Cl.
CPC ...... *G07F 17/3209* (2013.01); *G07F 17/3216* (2013.01)

(58) Field of Classification Search
None
See application file for complete search history.

(56) References Cited

U.S. PATENT DOCUMENTS

| | | | | |
|---|---|---|---|---|
| 7,129,634 | B2 * | 10/2006 | Boroson | H10K 59/30 313/506 |
| 8,395,571 | B2 * | 3/2013 | Kim | H10K 59/353 345/83 |
| 9,634,074 | B2 * | 4/2017 | Son | H10K 59/80 |
| 2016/0336530 | A1 * | 11/2016 | Zhang | H10K 50/828 |
| 2019/0304357 | A1 * | 10/2019 | Yang | H10K 59/65 |
| 2024/0203193 | A1 * | 6/2024 | Baum | G07F 17/3211 |

* cited by examiner

*Primary Examiner* — Sunit Pandya
(74) *Attorney, Agent, or Firm* — Sage Patent Group

(57) ABSTRACT

A gaming device includes a base and a transparent display disposed on the base including an emissive layer including an array of pixels, each including an emissive pixel element and a transparent portion, and a conductive layer operatively coupled to the emissive layer to selectively operate the emissive pixel elements. The gaming device further includes a processor circuit a memory storing machine-readable instructions that cause the processor circuit to selectively operate the transparent display. The transparent portion of each pixel is transparent to visible light in an inactive state such that an environment behind the transparent display is visible through the transparent portion to a user in front of the transparent display. Each pixel of the array of pixels emits light in an active state sufficient to obscure visibility of the environment behind the transparent display through the transparent portion to the user in front of the transparent display.

19 Claims, 12 Drawing Sheets

600

GAMING DEVICE WITH TRANSPARENT DISPLAY

BACKGROUND

Embodiments described herein relate to features of electronic wagering devices, and in particular to a gaming device with a transparent display in a gaming environment, such as in a casino environment, and related devices, systems, and methods. Conventional wagering games, such as wagering games provided at Electronic Gaming Machines (EGMs) in a casino environment, may have large, bulky housings that obstruct a player's view of an environment around the gaming device. There is a need for alternative gaming device arrangements that allow for a player to view and interact with a surrounding environment.

BRIEF SUMMARY

According to some embodiments, a gaming device includes a base and a transparent display disposed on the base. The transparent display includes an emissive layer including an array of pixels, each pixel of the array of pixels including an emissive pixel element and a transparent portion. The transparent display further includes a conductive layer operatively coupled to the emissive layer to selectively operate the emissive pixel elements. The gaming device further includes a processor circuit a memory storing machine-readable instructions that, when executed by the processor circuit, cause the processor circuit to selectively operate the transparent display. The transparent portion of each pixel is transparent to visible light in an inactive state such that an environment behind the transparent display is visible through the transparent portion to a user in front of the transparent display. Each pixel of the array of pixels emits light in an active state sufficient to obscure visibility of the environment behind the transparent display through the transparent portion to the user in front of the transparent display.

According to some embodiments, a system includes a plurality of gaming devices including a first gaming device and a second gaming device, and a transparent display associated with the first gaming device and the second gaming device. The transparent display includes an emissive layer including an array of pixels, each pixel of the array of pixels comprising an emissive pixel element and a transparent portion, and a conductive layer operatively coupled to the emissive layer to selectively operate the emissive pixel elements. The system further includes a processor circuit and a memory storing machine-readable instructions that, when executed by the processor circuit, cause the processor circuit to selectively operate the transparent display. The transparent portion of each pixel is transparent to visible light in an inactive state such that an environment on a second side of the transparent display is visible through the transparent portion to a user on a first side of the transparent display. Each pixel of the array of pixels emits light in an active state sufficient to obscure visibility of the environment on the second side of the transparent display through the transparent portion to the user on the first side of the transparent display.

According to some embodiments, a transparent display for a gaming device includes an emissive layer comprising an array of pixels, each pixel of the array of pixels including an emissive pixel element and a transparent portion, and a conductive layer operatively coupled to the emissive layer to selectively operate the emissive pixel elements. The transparent portion of each pixel is transparent to visible light in an inactive state such that an environment behind the transparent display is visible through the transparent portion to a user in front of the transparent display. Each pixel of the array of pixels emits light in an active state sufficient to obscure visibility of the environment behind the transparent display through the transparent portion to the user in front of the transparent display.

DETAILED DESCRIPTION

Figure 1:
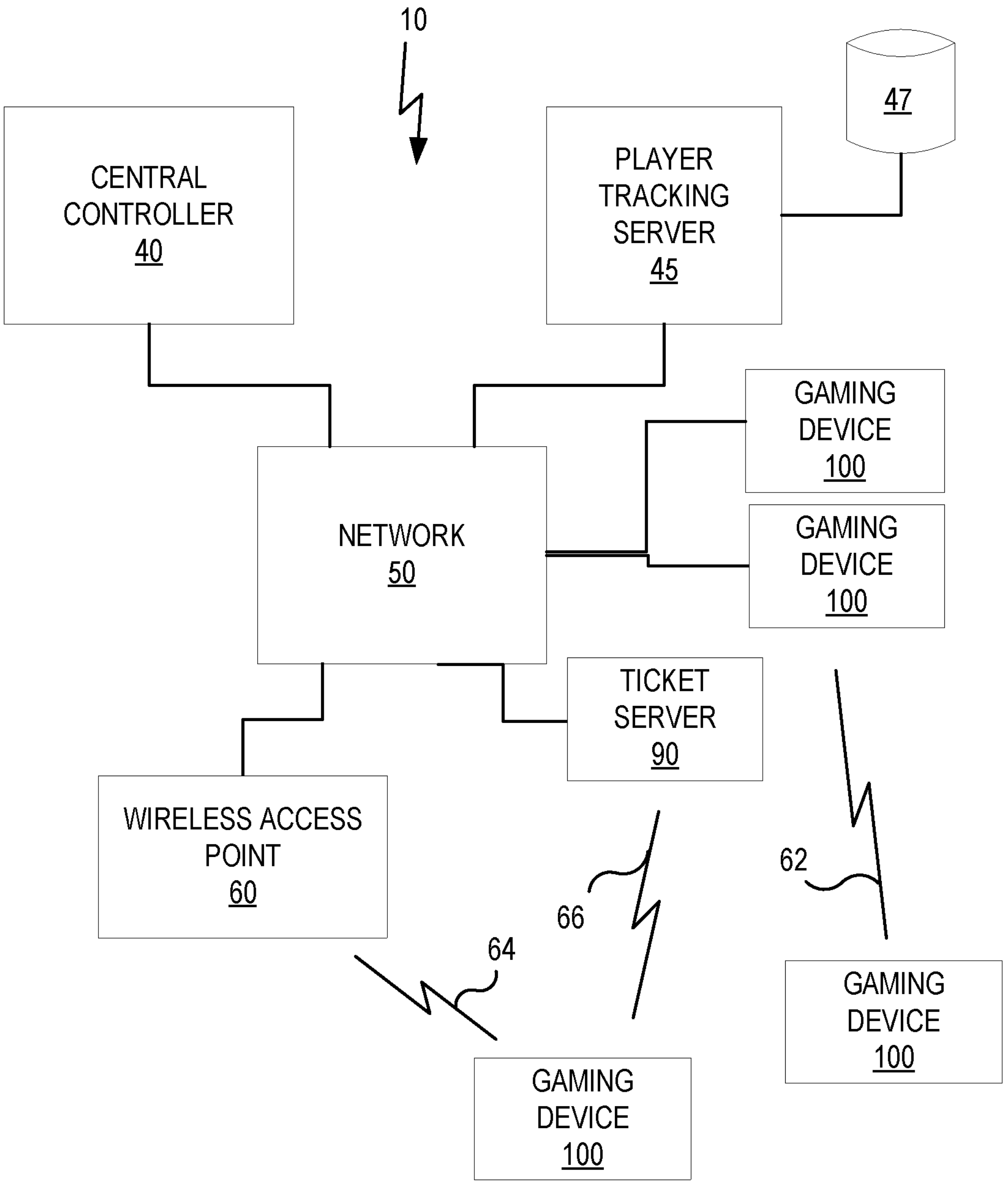
FIG. 1 is a schematic block diagram illustrating a network configuration for a plurality of gaming devices according to some embodiments.

Embodiments described herein relate to features of electronic wagering devices, and in particular to a gaming device with a transparent display in a gaming environment, such as in a casino environment, and related devices, systems, and methods.

According to some embodiments, a gaming device includes a base and a transparent display disposed on the base including an emissive layer including an array of pixels, each including an emissive pixel element and a transparent portion, and a conductive layer operatively coupled to the emissive layer to selectively operate the emissive pixel elements. The gaming device further includes a processor circuit a memory storing machine-readable instructions that cause the processor circuit to selectively operate the transparent display. The transparent portion of each pixel is transparent to visible light in an inactive state such that an environment behind the transparent display is visible through the transparent portion to a user in front of the transparent display. Each pixel of the array of pixels emits light in an active state sufficient to obscure visibility of the environment behind the transparent display through the transparent portion to the user in front of the transparent display.

Screens in casino environments have become increasingly large over the last years, with some being over 65 inches. This applies to EGMs, ETGs but also for merchandising and infotainment in the casino environment. Although these larger screens provide a large canvas to display content, it can be challenging for a consumer, being near to such a screen, to not get overwhelmed or lost on the casino floor but to remain aware of other offerings across the casino floor. Another downside of these large screens is that the larger a screen is the more difficult is it to have a direct line of sight to other casino offerings.

Many vendors have attempted to address these issues by placing screens in the upper area of the venue, close to the ceiling. This helps to make visitors be more aware of ground-level offerings, but to a drawback on casino surveillance systems, as due to that the cameras' line of sight is majorly impacted.

Transparent displays disclosed herein may be included in EGMs, table games, and other devices and systems, to permit a viewer to look through the screen and actively shift their focus towards content behind the screen, e.g., environmental content, internal components, etc. For example, a viewer could look through an EGM screen to view an environment behind the EGM and/or internal components of the EGM. A viewer could also view an environment behind a virtual table game dealer or view table game components, e.g., a roulette wheel or playing cards. These and other gaming offerings may be associated with events in the casino or other venue to adapt full or partial screen transparency dynamically to the events in real-time. These and other novel technical solution address the technical problem of providing increased player enjoyment and engagement.

These and other embodiments may employ Transparent Organic Light Emitting Diode (T-OLED) screens, which have the ability of dynamically changing certain areas of their screen surface between transparent, semi-transparent, and opaque states. As a result, screens and/or areas thereof can turn transparent when needed to enable a direct line of sight, opaque to have full focus on the content, or semi-transparent to provide a hybrid effect, as desired.

These and other types of transparent displays may also be controlled by a system controller which may be aware of events happening on the casino floor in real time, such as live events, announcements, bingo drawings, jackpot triggers on other gaming devices, happy hour information, etc. By dynamically turning screen contents transparent or semi-transparent the system controller can enable innovative methods of increasing casino visitors' awareness of nearby casino offerings without impacting their casino gaming experience. These and other features can also improve the experience of non-players who can see through the screens and get a more immersive view of the casino interior.

Transparent displays may be included in any number of devices and systems, including EGM base game screens, EGM top screens, screens placed in front of mechanical slot reels, EGM video toppers, etc. Other examples include a virtual dealer screen at a virtual table game (e.g., virtual poker table), screens covering a physical roulette wheel, vertical screens providing additional information and/or duplicating table game information, individual player screens, and/or a centrally placed screen or "video wall" associated with multiple machines. Optical sensors such as presence detectors, distance meters, gaze trackers, body/head posture trackers, etc., may also be used with the embodiments herein, and the screens may be controlled locally at the individual device, and/or by a central system controller, as desired. Advantages of these and other embodiments include the ability to provide novel form factors and designs, novel gaming features, providing benefits to operators by maintaining line of sight surveillance and players by allowing for different levels of immersion and allowing for greater ease of navigation in a casino environment.

T-OLED displays differ from conventional LED displays in that the pixels in the T-OLED display are self-illuminating, which can eliminate the need for a separate backlight for the display. When combined with a transparent substrate, e.g., glass, portions of the T-OLED display may be opaque when fully illuminated and transparent when deactivated, allowing for portions of the display to be selectively activated and deactivated independently to make the different portions transparent and opaque as desired, in different combinations, and dynamically modified in real time. Many T-OLED displays can be integrated with touch-sensitive sensors without impacting transparency, and may have a very wide field of view approaching 180 degrees.

In some examples, a player may be provided an option to manually adjust a transparency level of the display, e.g., by using a physical or graphical slider interface, applied to some or all of the content, e.g., the background, a portion of the display, specific graphical elements, etc., as desired. For example, outlines of text or other elements could be made more opaque to improve readability, while maintaining transparency through the interior of the elements.

In some embodiments, a dynamic transparency mode may be provided, and may be selectively enabled or disabled by the player and/or operator. When active, the dynamic transparency mode may dynamically make game elements semi-transparent when certain criteria are met, e.g., when the game elements are not relevant to the game, etc. For example, a background may remain transparent if nothing is occurring in the background, or a reel of a slot game may be transparent as long as the reel does not contain an element of a winning symbol combination.

In some examples, the transparent display may employ eye and/or gaze tracking features to determine what portions of the display are being viewed by the player and may be made transparent and/or opaque based on a gaze direction of the player. These and other features may also detect a player's level of distraction over time. For example, if the system determines that a player is increasingly focusing on other offerings, the game could increase the level of transparency so that the player becomes increasingly aware of other game offerings in the casino.

In some examples, transparent displays may be provided as dividers between EGMS, both to provide isolation from other players, and as an option for providing additional content, e.g., attract, informational, and/or game content, etc. The divider may be made opaque during play, or may remain transparent or semi-transparent to allow a player to view the EGM's surroundings. The divider display may place additional game elements in a player's peripheral vision during play, e.g., to attract the player's attention, or to move less relevant content out of a main play area while still maintaining visibility of the content, for example. For example, a player dashboard may be provided, with a friends list, drink orders, game preferences, music or media interface, another wagering game such as sports betting or keno, etc.

In some examples, EGMs may be designed and arranged in cube or stage-like configuration to allow players in front of the machines to fully see the game content with enough room for other players and/or spectators to see an area on the other side of the screen, such as in the center of the multi-machine configuration. For example, EGMs may be arranged in a circle around a stage or event, allowing the player to view and play at the same time using transparency. The events may be connected to each of the EGMs in the group, and may be able to dynamically control transparency in real-time based on the event.

In some examples, a transparent wall may be provided that enables full view of an environment may be fully or partly transparent (e.g., with attract or promotional content) when not played, with portions becoming multiple separate glass EGMs with opaque content when being played. For example, a large continuous screen, or several closely fitted screens, may be transparent with seats in front and/or on both sides, with a game screen appearing when a player takes a seat. The game screens may be dynamically placed based on player location, allowing players to choose how close together they want to sit. For example, a couple could choose to sit closely together or an individual player could choose to sit further away from other players. A maximum number of player stations may be configured by the operator, and seating density may be adjusted as needed based on casino traffic, social distancing requirements, etc. While many "game wall" implementations are placed on walls to avoid obstructing views, using transparent displays may enable placement of a large game wall in a central floor or other more favorable locations.

In some examples, multiplayer games and features may be provided, benefitting from the ability to look through the screen, see other players and/or other player's content, to enable co- or cross play opportunities. For example, content may dynamically be made visible to first and/or second player, and may allow a view of the other player when not visible. In some examples, players may physically interact with the game in novel ways. For example, a cooperation mode may include a player stepping in between the an EGM screen and a transparent display to interact with the game, e.g., to catch some falling coins, items etc. In some examples, 2 EGMs may be placed back to back, with players seeing each other while playing cooperatively, competitively, and/or independently from each other. In some examples, text displayed on one or both displays may rotate, e.g., with a 3D rotation animation, to allow players on both sides to read the text. In another example, when a big win or event happens in a vicinity of a certain number of EGMs, the displays of these EGMs may become transparent so players can see the jackpot event or big win from a neighboring EGM.

In some table game based embodiments, a transparent display may be provided to allow players to view real world elements and a surrounding environment. For example, a poker ETG may allow a virtual dealer to be displayed over a real-world casino environment. In some examples, transparent displays may be provided in front of each player so that additional content can be displayed while the player is watching the dealer and the other players.

In some examples, transparent displays may enable ETG game offerings (such as poker, baccarat, roulette, etc.) where physically present people may with virtually present people. The virtually present people can join the game e.g., via live stream on their mobile or desktop device by dialing into a free virtual slot of the ETG. The virtual player may be shown on the transparent display against the real world environment. In some examples, depth sensing cameras and/or software may identify the player vs. their background. A camera mounted on or near the transparent display could streaming the ETG's screen or a view of the physical table the virtual player.

A central controller unit may be used as a casino-wide screen transparency controller, e.g., connected to some or all of the gaming devices, and may be capable of adjusting their level of transparency individually and/or globally. The controller may be aware of any number of device parameters, such as a device type (EGM, ETG, stepper, dual player machine, . . . ), a configuration (cabinet type, bank configuration vs. single configuration, type of bank configuration), a number of other devices surrounded by (and their distance to each other), a number of screens, size and transparency capabilities (single screen, dual screen, curved screen, giant screen, . . . ), a location (absolute location in the venue, and relative location to other screens/events/amenities), alignment (direction of the player looking at when playing, relative to other screens/events/amenities), awareness about visibility of other machines/casino offerings for the player when screen is turned transparent vs. when screen is turned opaque, occupancy status (player actively playing, player sitting in front, device last time played), a number of detected observers around it (e.g., detected via camera; also, their gaze direction/head posture relative to device), revenue creation information ("hot machine", rarely played machine, above/below floor average), active games installed (multi game vs. single game, no. of games, current game, type of games, themes, . . . ), game configurations installed (denom, bet levels, activated features, RTP, . . . ), jackpot information (level of jackpot, potential high wins and their value, pulse to hit frequency, . . . ), a current transparency level (of each screen, each content type, etc.), actual events/offerings/amenities going on in the casino (concerts, live events, bingo drawings, jackpot triggers, happy hours, casino-wide bonus offerings, . . . ), date and time, casino occupancy level, and other device-related information, as desired.

In this regard, examples of systems and gaming devices for a gaming environment will be generally described. In this regard, FIG. 1 illustrates a gaming system 10 including a plurality of gaming devices 100. As discussed above, the gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
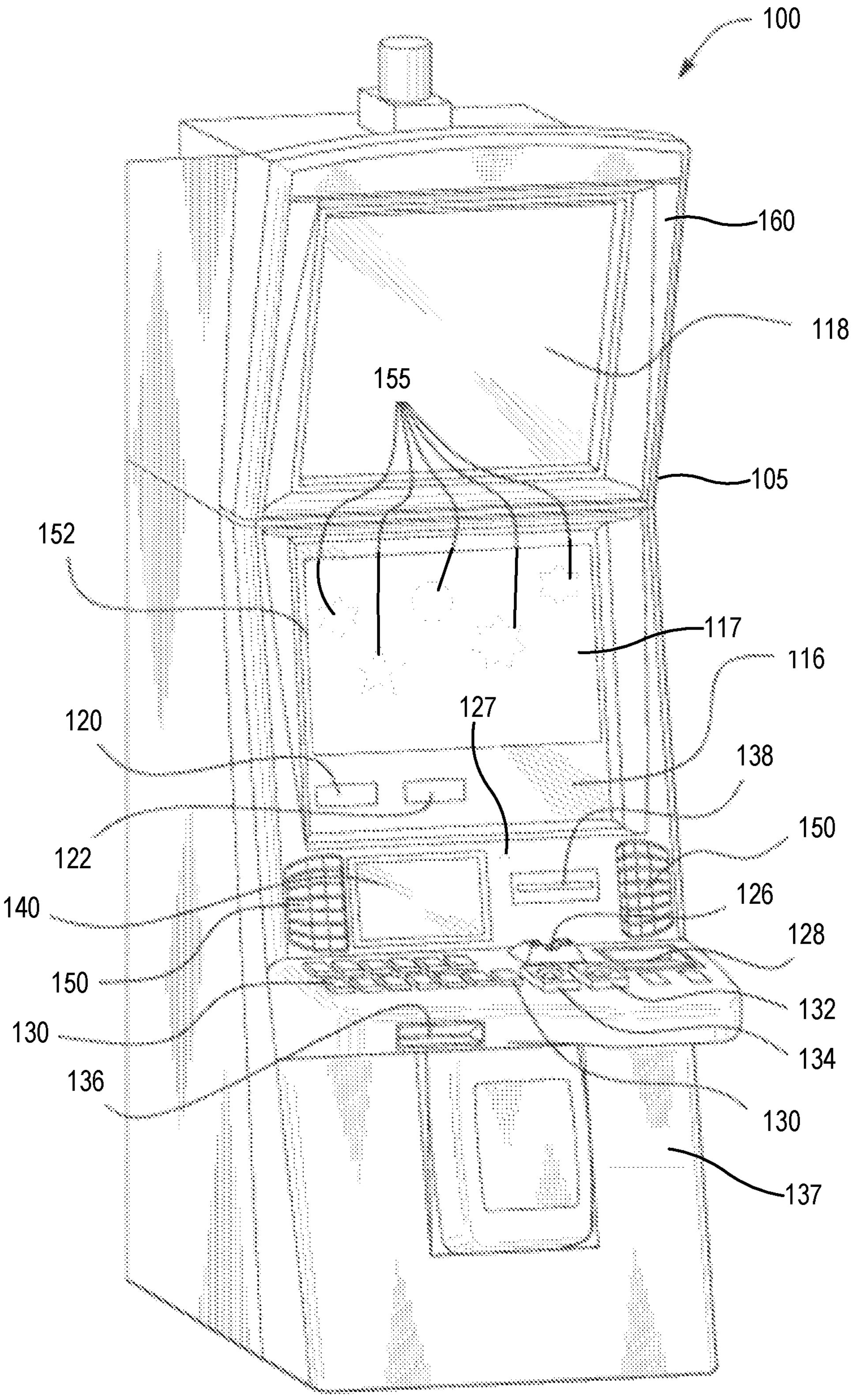
FIG. 2A is a perspective view of a gaming device that can be configured according to some embodiments.
Figure 2B:
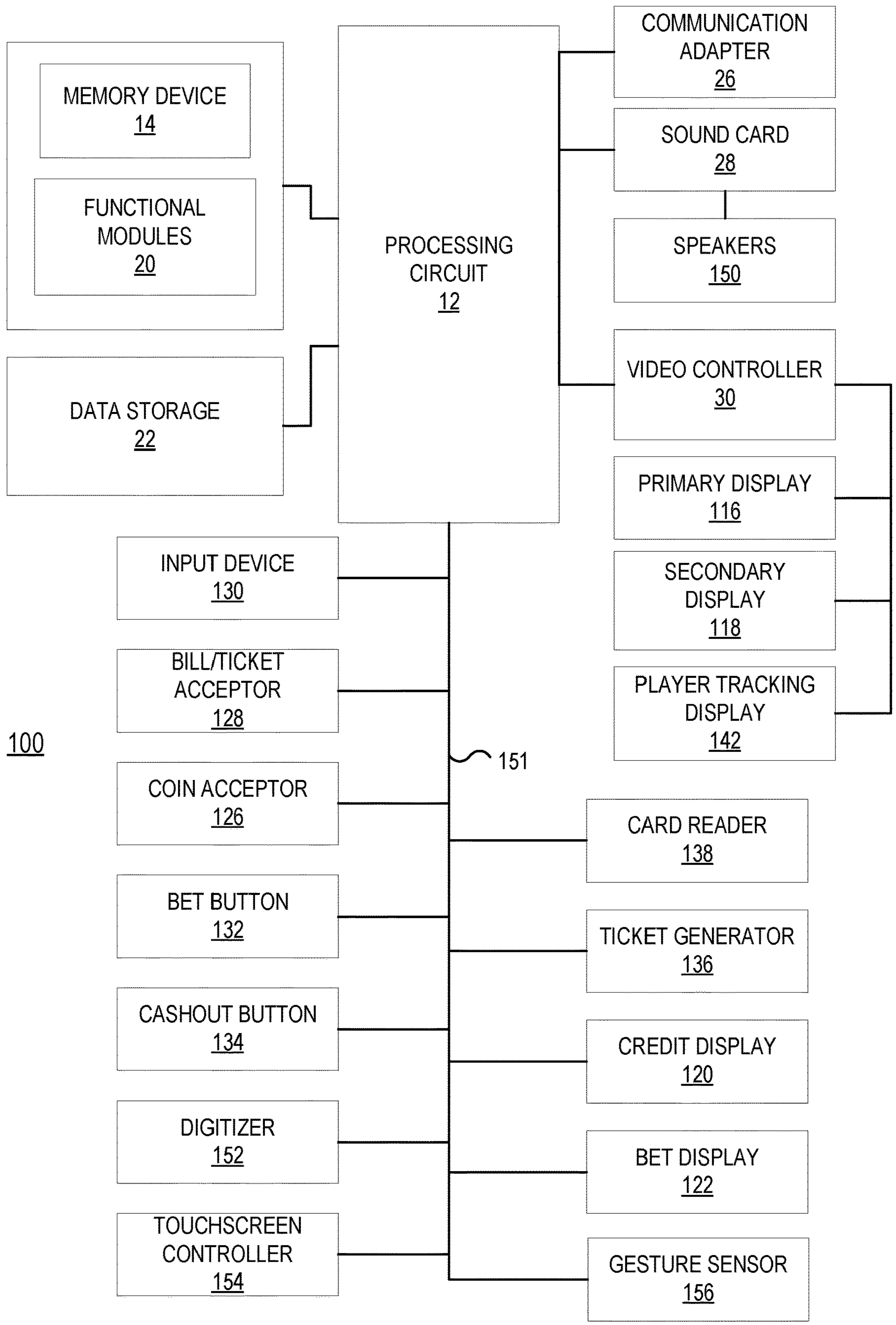
FIG. 2B is a schematic block diagram illustrating an electronic configuration for a gaming device according to some embodiments.
Figure 2C:
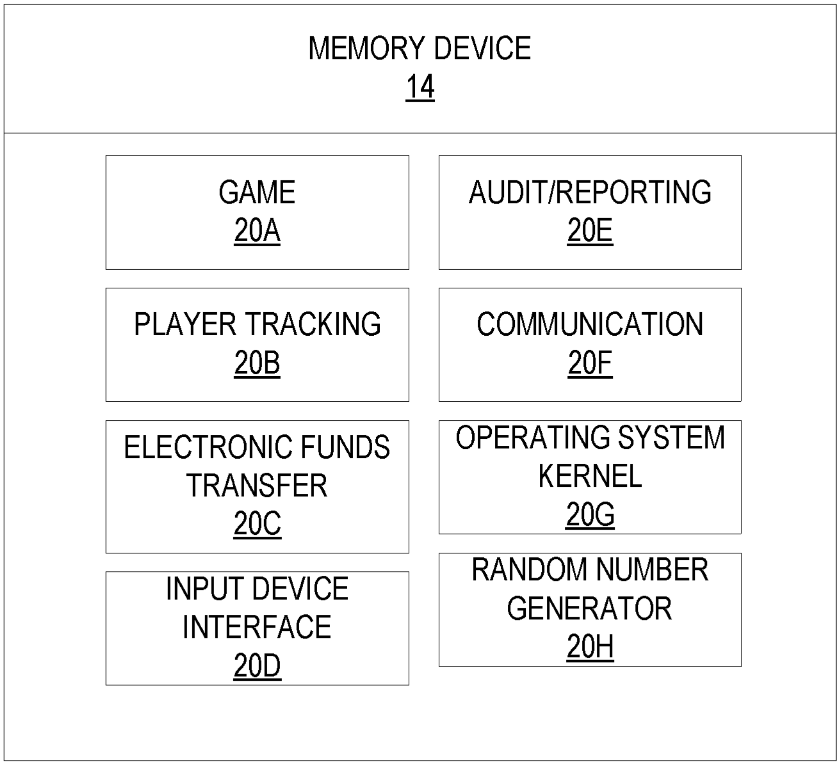
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
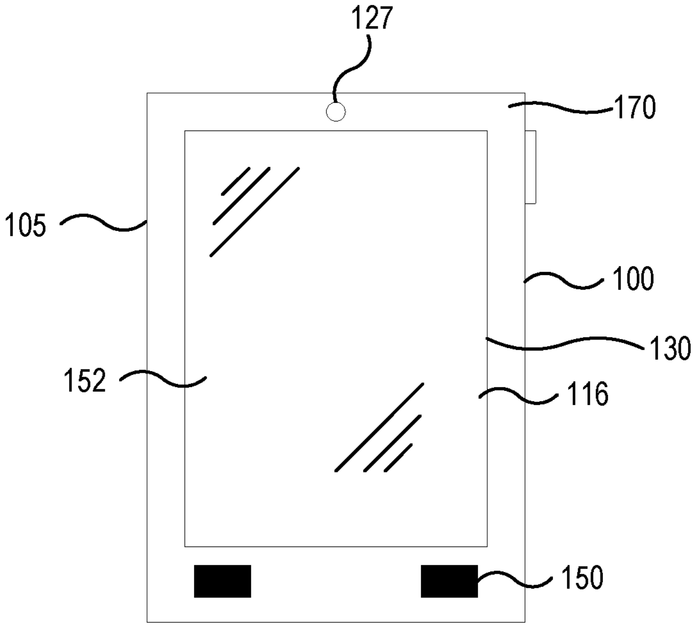
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. One or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
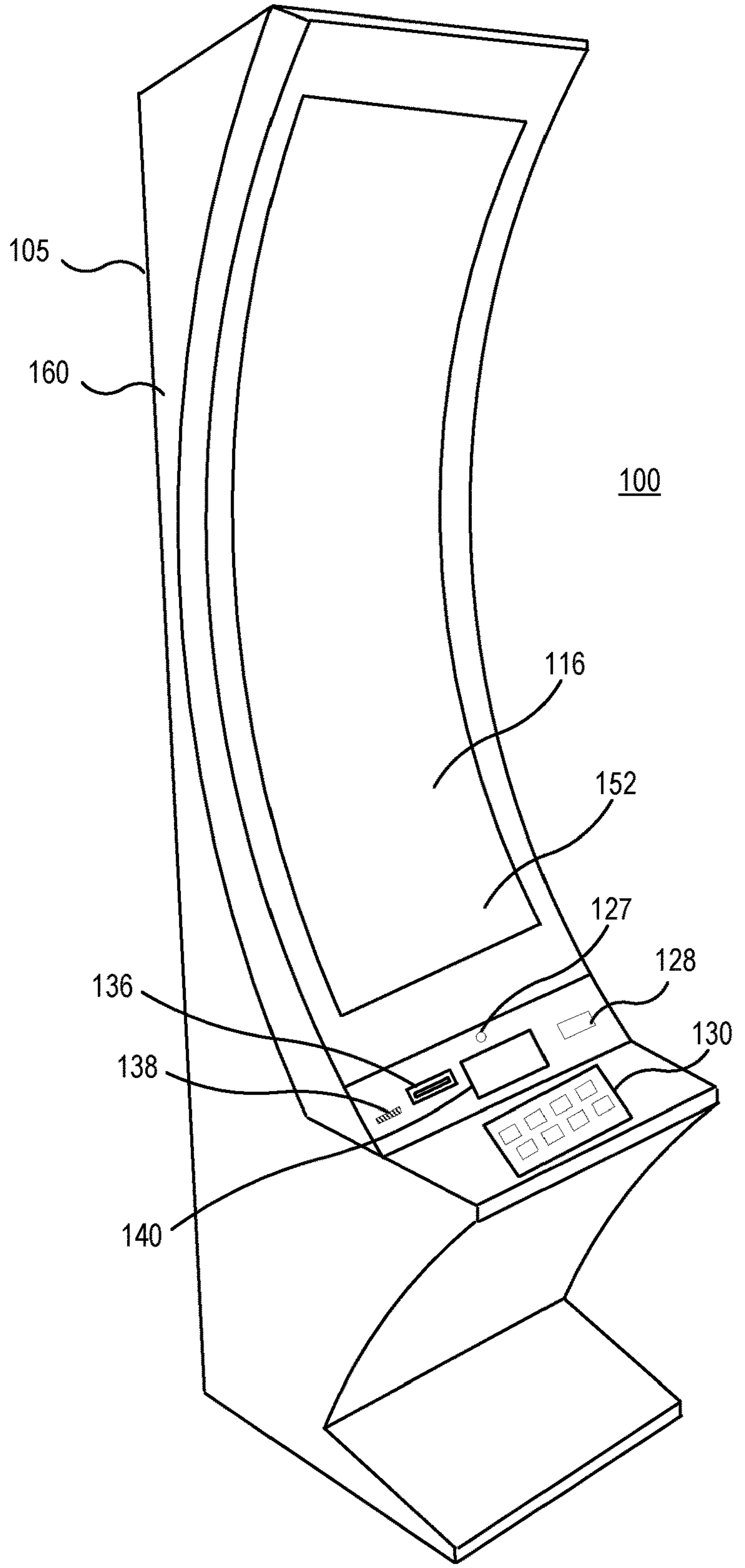
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Although illustrated as certain gaming devices, such as electronic gaming machines (EGMs) and mobile gaming devices, functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3A:
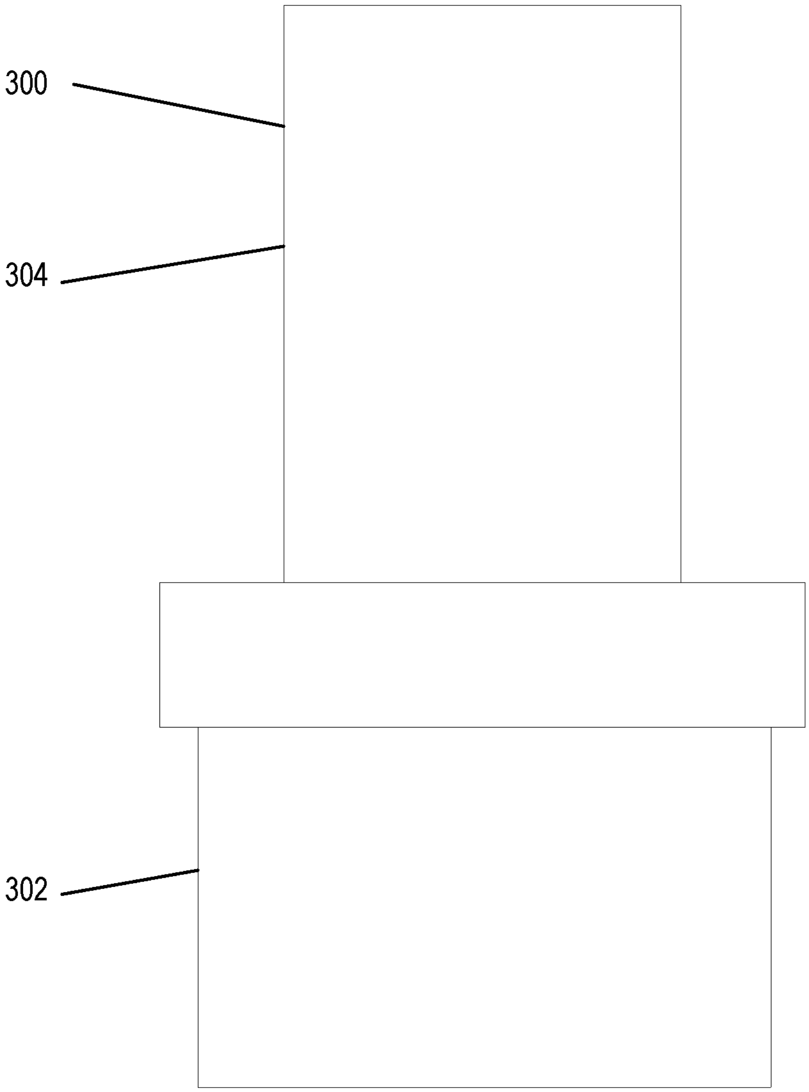
FIG. 3A-3C illustrate a gaming device having a transparent display with pixels that allow for selectively facilitating and/or obscuring visibility of an environment behind the display, according to some embodiments.
Figure 3B:
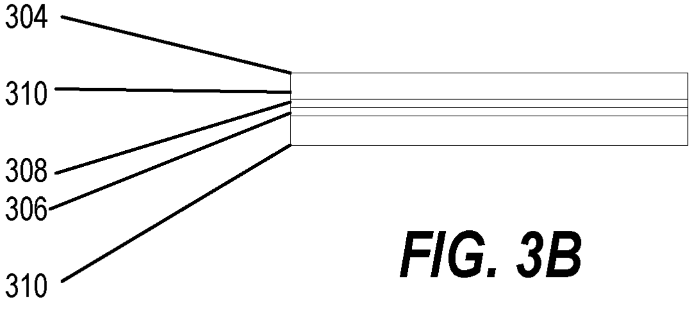
Figure 3C:
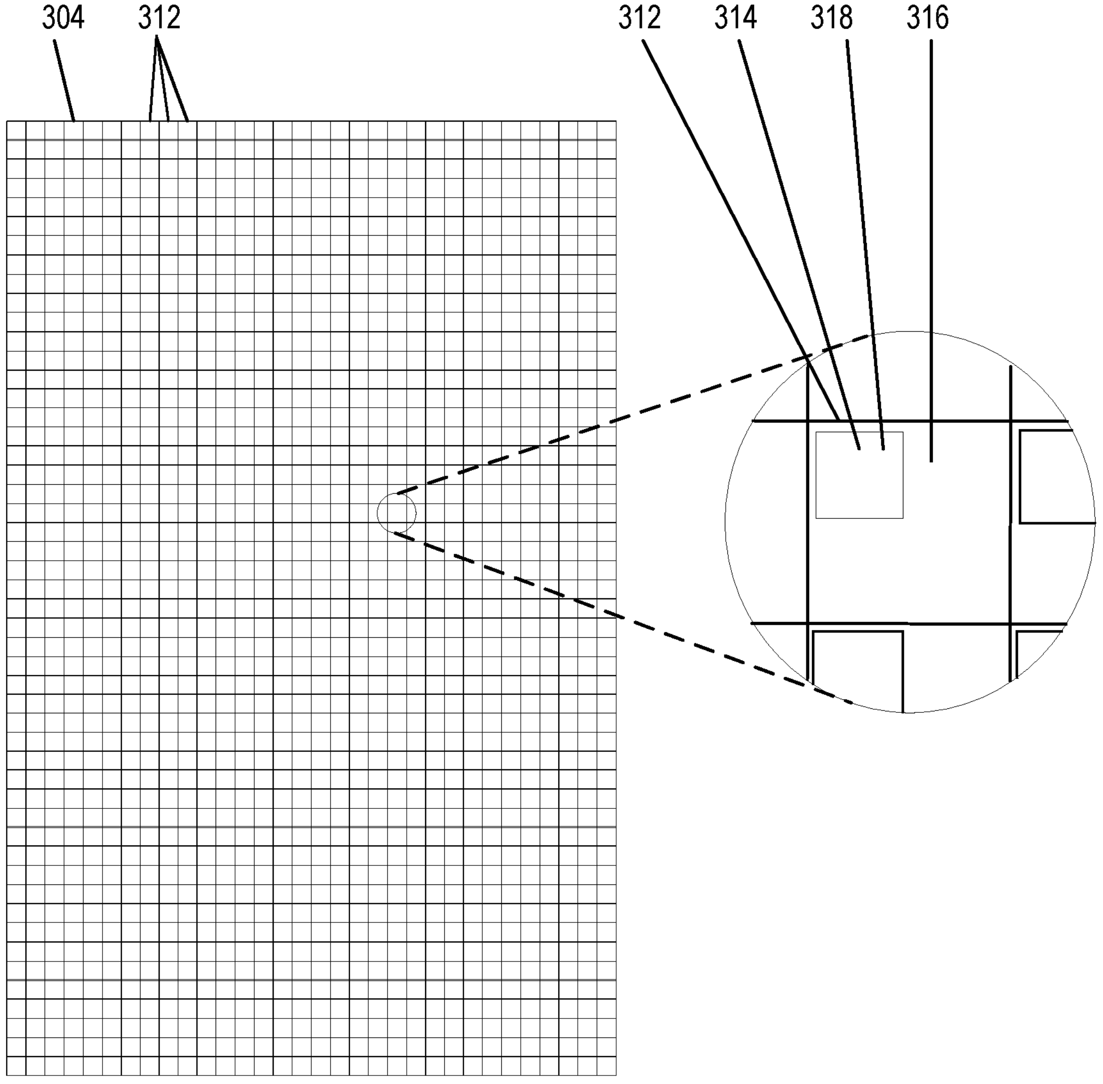

In this regard, FIGS. 3A-3C illustrate a gaming device 300 having a transparent display 304 with pixels 312 that allow for selectively facilitating and/or obscuring visibility of an environment behind the display 304, according to some embodiments. As shown by FIG. 3A, the gaming device 300 in this embodiment includes a base 302 and a transparent display 304 disposed on the base 302. FIG. 3B illustrates a cross sectional view of the transparent display 304, including an emissive layer 306, a conductive layer 308 operatively coupled to the emissive layer 306, and one or more transparent glass layers 310. In this example, the emissive layer 306 and the conductive layer 308 are attached to the transparent glass layer(s) 310 to provide structural support and protection for the emissive layer 306 and/or the conductive layer 308.

As shown by FIG. 3C, the emissive layer 306 includes an array of pixels 312, with each pixel 312 including an emissive pixel element 314 and a transparent portion 316. In this example, each emissive pixel element 314 includes an Organic Light Emitting Diode (OLED) element 318. Unlike conventional liquid crystal displays, OLED elements 318 and other types of emissive pixel elements 314 are self-illuminating, such that the conductive layer 308 may selectively operate the emissive pixel elements 314 individually to emit light in an active state while other pixels 312 may remain unilluminated in an inactive state.

In this example, the transparent portion 316 of each pixel 312 is transparent to visible light in the inactive state such that an environment behind the transparent display 304 is visible through the transparent portion 316. In this example, a relative area of the transparent portion 316 is larger than the area of the emissive pixel element 314, such that the entire pixel 312 is substantially transparent. Meanwhile, each pixel 312 in an active state emits light sufficient to obscure visibility of the environment behind the transparent display 304 through the pixel 312. For example, the OLED element 318 in this example may self-illuminate with sufficient brightness to overpower and ambient light passing through the transparent portion 316 such that the environment is not visible through the transparent portion 316 of the illuminated pixel 312. In some embodiments, an area of the transparent portion 316 of each pixel 312 may be between 5% and 95% of a total area of the pixel 312. For example, as pixel brightness increases and as pixel size is reduced, the transparent portion 316 of the pixel 312 may approach 100% of the total area of the pixel 312. In some embodiments, the array of pixels 312 may have a pixel density that may surpass the ability of the human eye to detect individual pixels at an appropriate viewing distance. For example, for larger displays at longer viewing distances, pixel densities of 100 dots per inch (DPI) or less may be appropriate. On the other hand, for smaller displays at shorter viewing distances, pixel densities of 2000 dots per inch (DPI) or more may be appropriate.

Figure 4A:
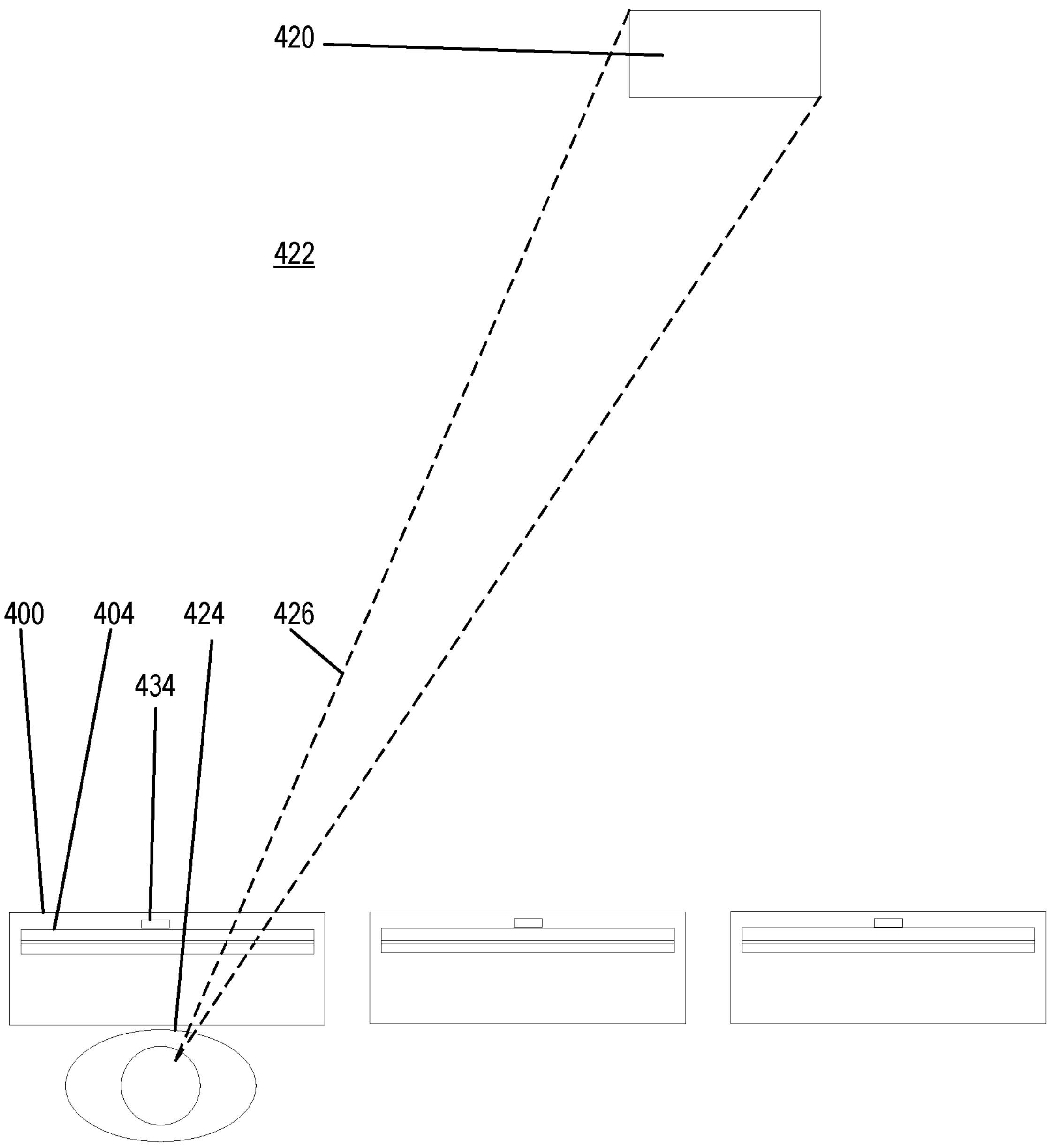
FIG. 4A-4C illustrate selectively facilitating and/or obscuring visibility of environmental elements through a transparent display of a gaming device, according to some embodiments.
Figure 4B:
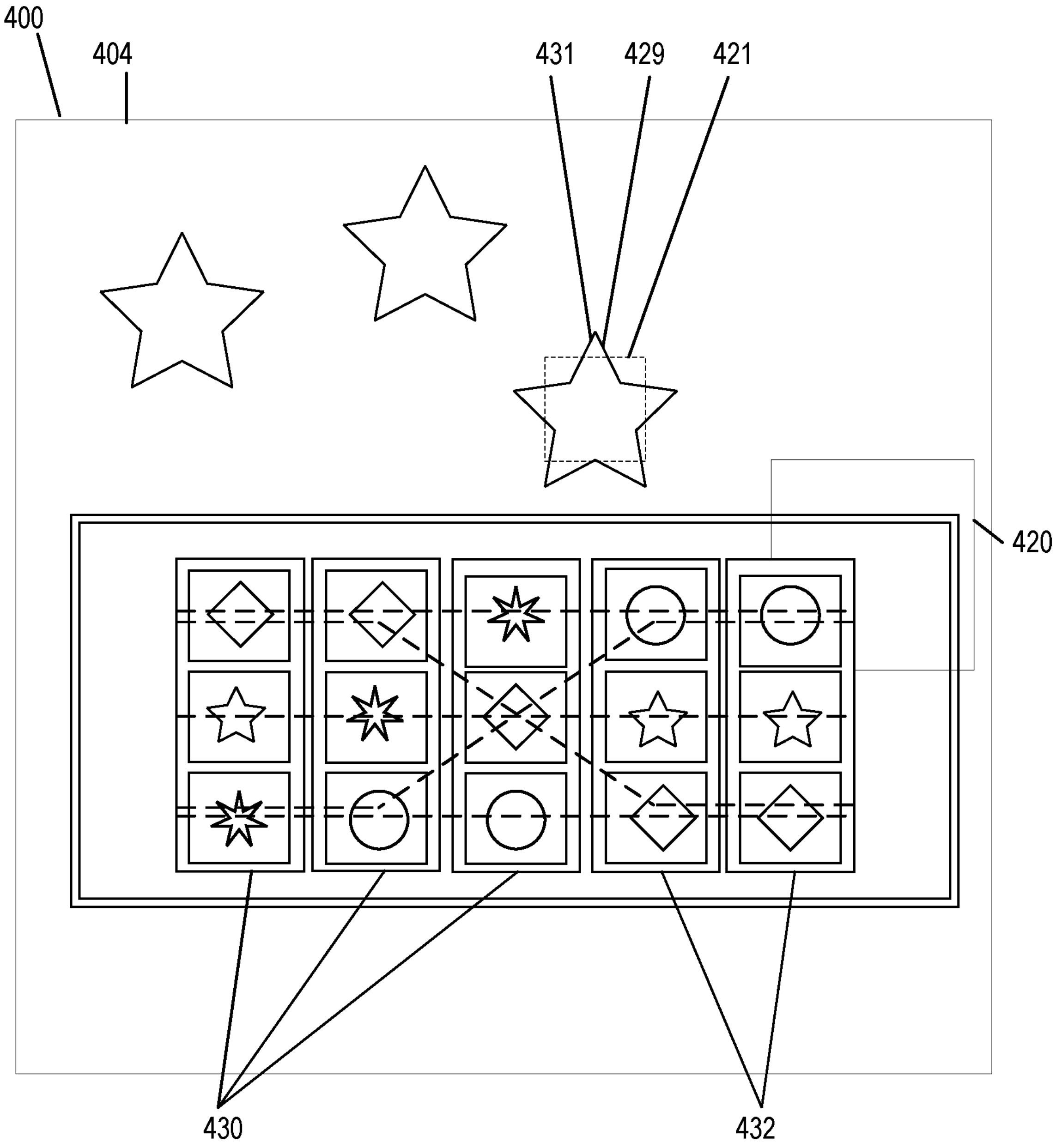
Figure 4C:
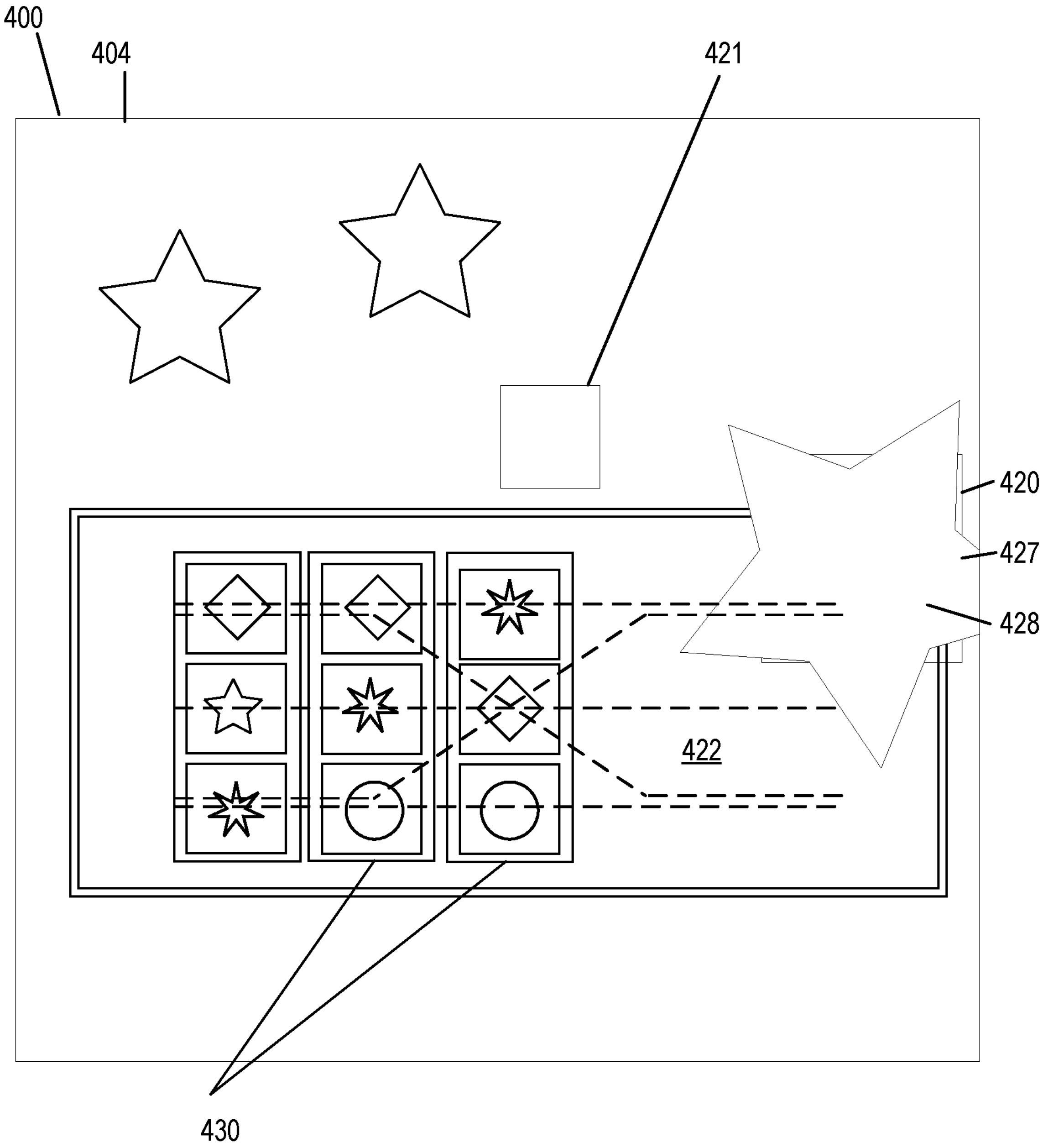

Referring now to FIGS. 4A-4C, a gaming device 400 similar to the gaming device 300 of FIGS. 3A-3C is provided in a casino or other environment 422. In this example, the gaming device 400 may determine that an object 420 in the environment 422 behind the transparent display 404 of the gaming device 400 is in a field of view 426 of a user 424 of the gaming device 400. As shown by FIGS. 4B and 4C, the gaming device 400 may selectively operate the transparent display 404 to cause a subset 427 of the array of pixels of the transparent display 404 to be in an active state to obscure visibility of the object 420 to the user 424. For example, in this example, the gaming device 400 may determine that the object 420 is a distraction to the user 424 and may position a graphical game element 428 on the transparent display 404 such that the game element 428 is positioned in the field of view 426 between the object 420 and the user 424. Alternatively, or in addition, the gaming device may selectively operate the transparent display 404 to cause another subset 429 of the array of pixels to be in an inactive state to enhance visibility of another object 421 to the user.

In some examples, the gaming device 400 may employ a gaze tracking sensor 434 to determine a gaze direction 436 of the user 424. The gaming device 400 may then determine that an object 421 in the environment 422 in the gaze direction 436 of the user 424 is obscured by a game element 431 being displayed on the transparent display 404, and may selectively operate the transparent display 404 to cause pixels associated with the game element 431 to be in an inactive state to reduce visibility of the game element 431 and increase visibility of the object 421. Conversely, the gaming device 400 may determine that an object 420 in the environment 422 in the gaze direction 436 of the user 424 is visible to the user 424, and may selectively operate the transparent display 404 to cause a subset 427 of pixels to be in an active state to reduce visibility of the object 420.

In some examples, the gaming device 400 may determine a game play state for the gaming device 400 and may determine a plurality of game elements 431 being displayed on the transparent display 404. The gaming device 400 may then selectively operate pixels associated with the game elements 431 based on the game play state. For example, the gaming device 400 may determine, for each game element 431, whether the game element meets a relevance value based on the game play state. As shown by FIGS. 4B and 4C, for each game element 431 that does not meet the relevance value, the transparent display 404 may be selectively operated to cause pixels associated with the game elements 431 to be in an inactive state to reduce visibility of the game element 431. For example, in the reel-based slot game shown in FIGS. 4B and 4C, the first three reels 430 may be determined to contain relevant game elements, i.e., game symbols contributing to a winning result, while the last two reels 432 may be determined to contain irrelevant game elements, i.e., game symbols that do not contribute to a winning result. As shown in FIG. 4C, the reels 432 containing irrelevant game elements may be dimmed or disabled by the transparent display 404, e.g., to allow for greater visibility of the environment 422 and/or to draw attention to the reels 430 having relevant game elements, as desired.

Figure 5:
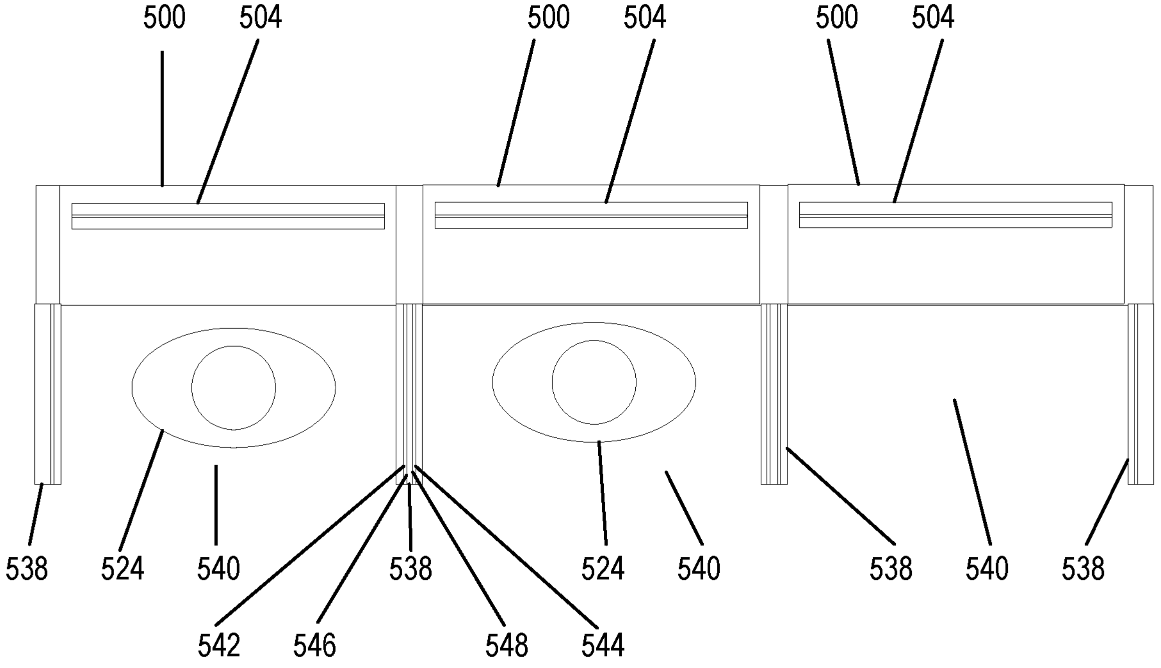
FIG. 5 illustrates a plurality of gaming devices having transparent displays for selectively facilitating and/or obscuring visibility of environmental elements through the displays, according to some embodiments.

FIG. 5 illustrates a plurality of gaming devices 500 having transparent displays 504 for selectively facilitating and/or obscuring visibility of environmental elements through the displays 504, according to some embodiments. In this example, the plurality of gaming devices 500 are arranged in a row, with a divider 538 containing the display 504 arranged between each pair of seating positions 540. As with the transparent displays 304, 404 above, each display 504 includes a plurality of pixels, e.g., OLED pixels, wherein transparent portion of each pixel is transparent to visible light in an inactive state such that an environment on an opposite side of the transparent display 504 is visible through the transparent portion to a user 524 viewing the transparent display. Likewise, each pixel of the array of pixels emits light in an active state sufficient to obscure visibility of the environment on the opposite side of the transparent display 504 to the user 524 viewing the transparent display 504. In this example, each display 504 is a two-way display, such that an environment is visible through the transparent portion of inactive pixels to a user 524 on either side of the transparent display 504, and visibility of the environment through the transparent portion to a user 524 on either side of the transparent display 504. In another embodiment, the displays 504 may be one-way displays, with the transparent portion of each pixel may be transparent or opaque to visible light in both an inactive state and an active state from one direction, such that an environment is always visible through the transparent portion and/or always opaque to a user on one side of the transparent display 504.

In some examples, the transparent display 504 may include a first transparent display 542 and a second transparent display 544 arranged such that a back side 546 of the first transparent display 542 faces a back side 548 of the second transparent display 544, to facilitate different images being shown on opposite sides of the transparent display 504.

In some examples, a user 524 may provide an input at the respective gaming device 500 to cause the divider 538 to modify visibility therethrough in one or both directions, as desired.

Figure 6:
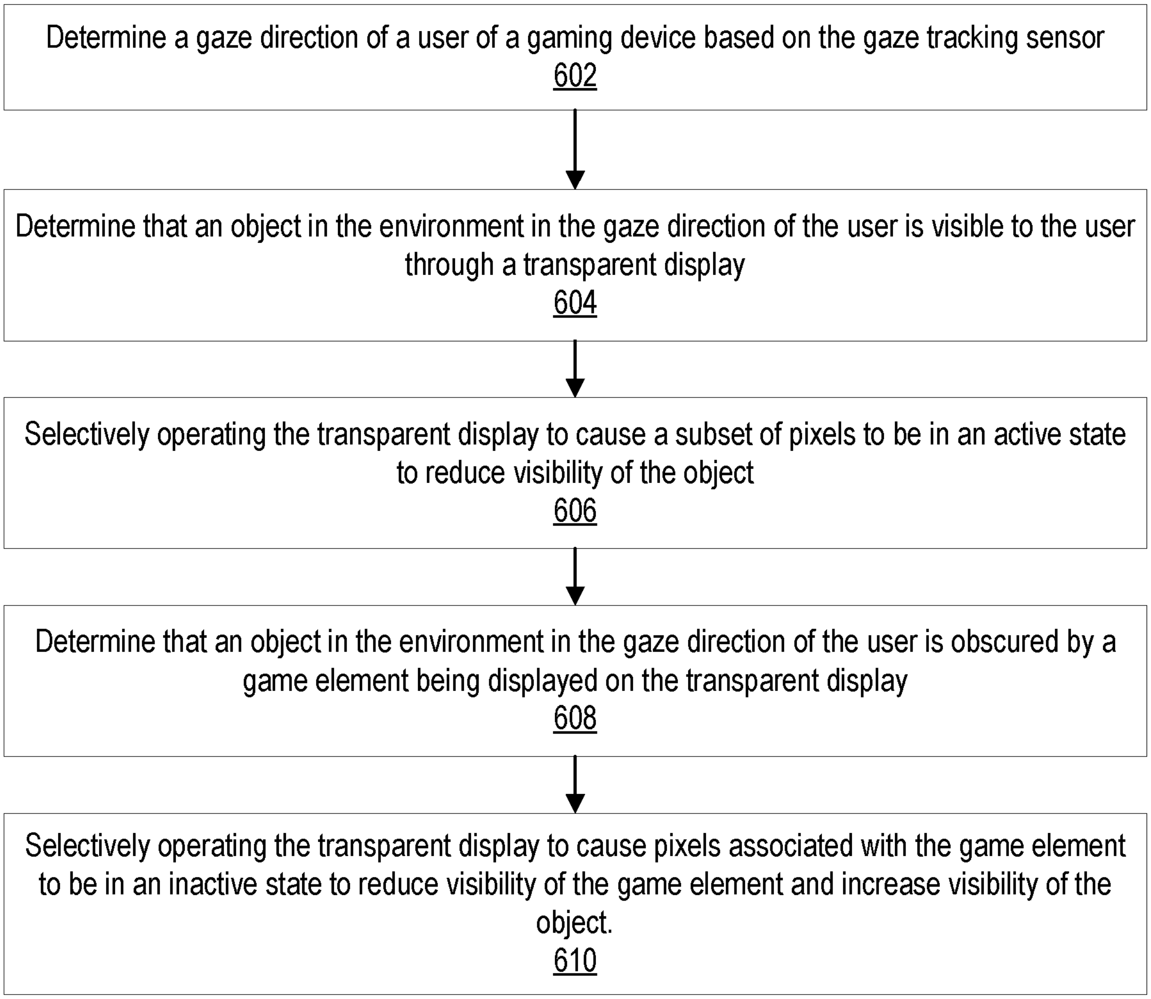
FIG. 6 is a flowchart illustrating operations of systems/methods of operating a transparent display, according to some embodiments.

FIG. 6 is a flowchart illustrating operations 600 of systems/methods for facilitating embodiments described herein. The operations 600 may include determining a gaze direction of a user of a gaming device based on the gaze tracking sensor (Block 602), such as the gaze tracking sensor 434 of FIGS. 4A-4C above. The operations 600 may further include determining that an object in the environment in the gaze direction of the user is visible to the user through a transparent display (Block 604). In response to the determination, the operations 600 may selectively operate the transparent display to cause a subset of pixels to be in an active state to reduce visibility of the object (Block 606).

Alternatively, or in addition, the operations 600 may determine that an object in the environment in the gaze direction of the user is obscured by a game element being displayed on the transparent display (Block 608). In response to the determination, the operations 600 may selectively operate the transparent display to cause pixels associated with the game element to be in an inactive state to reduce visibility of the game element and increase visibility of the object (Block 610).

Embodiments described herein may be implemented in various configurations for gaming devices 100, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A gaming device comprising:

a base;

a transparent display disposed on the base, the transparent display comprising:

an emissive layer comprising an array of pixels, each pixel of the array of pixels comprising an emissive pixel element and a transparent portion; and a conductive layer operatively coupled to the emissive layer to selectively operate the emissive pixel elements;

a processor circuit; and a memory storing machine-readable instructions that, when executed by the processor circuit, cause the processor circuit to selectively operate the transparent display, wherein the transparent portion of each pixel is transparent to visible light in an inactive state such that an environment behind the transparent display is visible through the transparent portion to a user in front of the transparent display, and wherein each pixel of the array of pixels emits light in an active state sufficient to obscure visibility of the environment behind the transparent display through the transparent portion to the user in front of the transparent display;

determine, for each game element of a plurality of game elements being displayed on the transparent display, whether the game element meets a relevance value based on a game play state for the gaming device; and for each game element that does not meet the relevance value, selectively operate the transparent display to cause pixels associated with the game element to be in an inactive state to reduce visibility of the game element.

2. The gaming device of claim 1, wherein the transparent display further comprises a transparent glass layer, wherein the emissive layer and the conductive layer are attached to the transparent glass layer.

3. The gaming device of claim 1, wherein the transparent display comprises a transparent Organic Light-Emitting Diode (OLED) display, and wherein the emissive pixel element of each pixel comprises an OLED element.

4. The gaming device of claim 1, wherein the instructions further cause the processor circuit to:

determine an object in the environment behind the transparent display in a field of view of the user; and selectively operate the transparent display to cause a subset of the array of pixels to be in an active state to obscure visibility of the object to the user.

5. The gaming device of claim 1, wherein the instructions further cause the processor circuit to:

determine an object in the environment behind the transparent display in a field of view of the user; and selectively operate the transparent display to cause a subset of the array of pixels to be in an inactive state to enhance visibility of the object to the user.

6. The gaming device of claim 1, the transparent display comprising a divider to separate the user from an adjacent user of an adjacent gaming device.

7. The gaming device of claim 6, wherein the instructions further cause the processor circuit to:

receive an input from the user to modify visibility through the divider; and based on the input, operate the transparent display to modify visibility through the divider.

8. The gaming device of claim 1, further comprising a gaze tracking sensor, wherein the instructions further cause the processor circuit to:

determine a gaze direction of a user of the gaming device based on the gaze tracking sensor;

determine that an object in the environment in the gaze direction of the user is obscured by a game element being displayed on the transparent display; and selectively operate the transparent display to cause pixels associated with the game element to be in an inactive state to reduce visibility of the game element and increase visibility of the object.

9. The gaming device of claim 1, further comprising a gaze tracking sensor, wherein the instructions further cause the processor circuit to:

determine a gaze direction of a user of the gaming device based on the gaze tracking sensor;

determine that an object in the environment in the gaze direction of the user is visible to the user; and selectively operate the transparent display to cause a subset of pixels to be in an active state to reduce visibility of the object.

10. A system comprising:

a plurality of gaming devices comprising a first gaming device comprising a first game display and a second gaming device comprising a second game display;

a divider to separate a user of the first gaming device from user of the second gaming device, the divider comprising a transparent display comprising:

an emissive layer comprising an array of pixels, each pixel of the array of pixels comprising an emissive pixel element and a transparent portion; and a conductive layer operatively coupled to the emissive layer to selectively operate the emissive pixel elements;

a processor circuit; and a memory storing machine-readable instructions that, when executed by the processor circuit, cause the processor circuit to selectively operate the transparent display, wherein the transparent portion of each pixel is transparent to visible light in an inactive state such that an environment on a second side of the transparent display is visible through the transparent portion to a user on a first side of the transparent display, and wherein each pixel of the array of pixels emits light in an active state sufficient to obscure visibility of the environment on the second side of the transparent display through the transparent portion to the user on the first side of the transparent display.

11. The system of claim 10, wherein the transparent portion of each pixel is transparent to visible light in an inactive state such that an environment on a first side of the transparent display is visible through the transparent portion to a user on a second side of the transparent display, and wherein each pixel of the array of pixels emits light in an active state sufficient to obscure visibility of the environment on the first side of the transparent display through the transparent portion to the user on the second side of the transparent display.

12. The system of claim 10, wherein the transparent portion of each pixel is transparent to visible light in an inactive state such that an environment on a first side of the transparent display is visible through the transparent portion to a user on a second side of the transparent display, and wherein the transparent portion of each pixel is transparent to visible light in an active state such that an environment on a first side of the transparent display is visible through the transparent portion to a user on a second side of the transparent display.

13. The system of claim 12, wherein the transparent display comprises a first transparent display and a second transparent display arranged such that the second side of the first transparent display faces the second side of the second transparent display.

14. The system of claim 10, further comprising a third gaming device comprising a third game display; and a second divider to separate the user of the second gaming device from a user of the third gaming device, the divider comprising a second transparent display.

15. The system of claim 10, wherein the instructions further cause the processor circuit to:

receive an input from the user to modify visibility through the divider; and based on the input, operate the transparent display to modify visibility through the divider.

16. A transparent display device for a gaming device, the transparent display device comprising:

an emissive layer comprising an array of pixels, each pixel of the array of pixels comprising an emissive pixel element and a transparent portion;

a conductive layer operatively coupled to the emissive layer to selectively operate the emissive pixel elements, wherein the transparent portion of each pixel is transparent to visible light in an inactive state such that an environment behind the transparent display device is visible through the transparent portion to a user in front of the transparent display device, and wherein each pixel of the array of pixels emits light in an active state sufficient to obscure visibility of the environment behind the transparent display device through the transparent portion to the user in front of the transparent display device;

a gaze tracking sensor;

a processor circuit; and a memory storing machine-readable instructions that, when executed by the processor circuit, cause the processor circuit to:

determine a gaze direction of a user of the gaming device based on the gaze tracking sensor;

determine, based on the gaze direction of the user, that an object in the environment in the gaze direction of the user is obscured by a game element being displayed on the transparent display device; and selectively operate the transparent display device to cause pixels associated with the game element to be in an inactive state to reduce visibility of the game element and increase visibility of the object.

17. The transparent display device of claim 16, wherein the transparent display device further comprises a transparent glass layer, wherein the emissive layer and the conductive layer are attached to the transparent glass layer.

18. The transparent display device of claim 16, wherein the transparent display device comprises a transparent Organic Light-Emitting Diode (OLED) display, and wherein the emissive pixel element of each pixel comprises an OLED element.

19. The transparent display device of claim 16, wherein the instructions further cause the processor circuit to:

determine, based on the gaze direction of the user, that an object in the environment in the gaze direction of the user is visible to the user; and selectively operate the transparent display device to cause a subset of pixels to be in an active state to reduce visibility of the object.

* * * * *